Aug. 26, 1941.　　　　G. H. BRYAN　　　　2,253,683
GEAR CUTTING MACHINE
Filed Sept. 5, 1939　　　　4 Sheets-Sheet 1

INVENTOR
GEORGE H. BRYAN
BY
ATTORNEY

Aug. 26, 1941.  G. H. BRYAN  2,253,683
GEAR CUTTING MACHINE
Filed Sept. 5, 1939  4 Sheets-Sheet 2

INVENTOR
GEORGE H. BRYAN
BY
ATTORNEY

Aug. 26, 1941. G. H. BRYAN 2,253,683
GEAR CUTTING MACHINE
Filed Sept. 5, 1939 4 Sheets-Sheet 4

Inventor
GEORGE H. BRYAN
Attorney

Patented Aug. 26, 1941

2,253,683

UNITED STATES PATENT OFFICE 2,253,683

GEAR CUTTING MACHINE

George H. Bryan, Rochester, N. Y., assignor to Gleason Works, Rochester, N. Y., a corporation of New York Application September 5, 1939, Serial No. 293,417

12 Claims. (Cl. 90—5)

The present invention relates to machines for producing gears and particularly to machines for generating spiral bevel gears of small sizes.

There are two types of machines in general use today for generating bevel gears, namely, the "geared-roll" type of machine and the "segment-roll" type of machine. In the "geared-roll" type of machine, the cradle and the work spindle are driven in the timed relation, which is required to effect generation of the tooth profiles, by a train of gearing that includes sets of change gears for governing the rate and ratio of the roll. In the "segment-roll" type of machine, the generating motion is effected by a pair of segments, one of which is connected to the work spindle and the other of which has a fixed relation to the tool mechanism. When the cradle is oscillated, one segment rolls on the other, imparting the required ratio of generating roll between the work and the tool mechanism.

Heretofore, small size bevel gear generators have been made of the "segment-roll" type, because with such machines the gearing required is reduced to a minimum and the machines therefore may be made quite simple and compact. With "segment-roll" machines, however, it is necessary to change one or both segments when generating gears of different ratios. The segments are relatively expensive. Hence, the "segment-roll" type of machine is really primarily adapted for high production work.

The primary object of the present invention is to provide a bevel gear generating machine of the "geared-roll" type which will be suitable for jobbing production of gears of small sizes and which at the same time is relatively simple in construction and compact, and capable of employment efficiently on high-production work.

A further object of the invention is to provide a novel "geared-roll" type generating drive between the cradle and the work spindle which will permit of employing a minimum number of gears in the generating train.

Another object of the invention is to provide a "geared-roll" type generating drive for a bevel gear cutting machine which will enable the special and expensive reversing mechanism heretofore required to be eliminated.

Still another object of the invention is to provide a bevel gear generating machine with which two sides of a spiral bevel gear tooth space may be cut simultaneously without "bias bearing."

A still further object of the invention is to provide a bevel gear generating machine in which cutting of the gear blank takes place during the up-roll of the cradle only and the return roll is effected at relatively high speed, and in which means is provided for preventing the weight of the cradle and other parts from driving the machine during the return roll.

The invention includes a number of other meritorious features as will appear hereinafter from the specification and will be pointed out in the appended claims.

Figure 1:
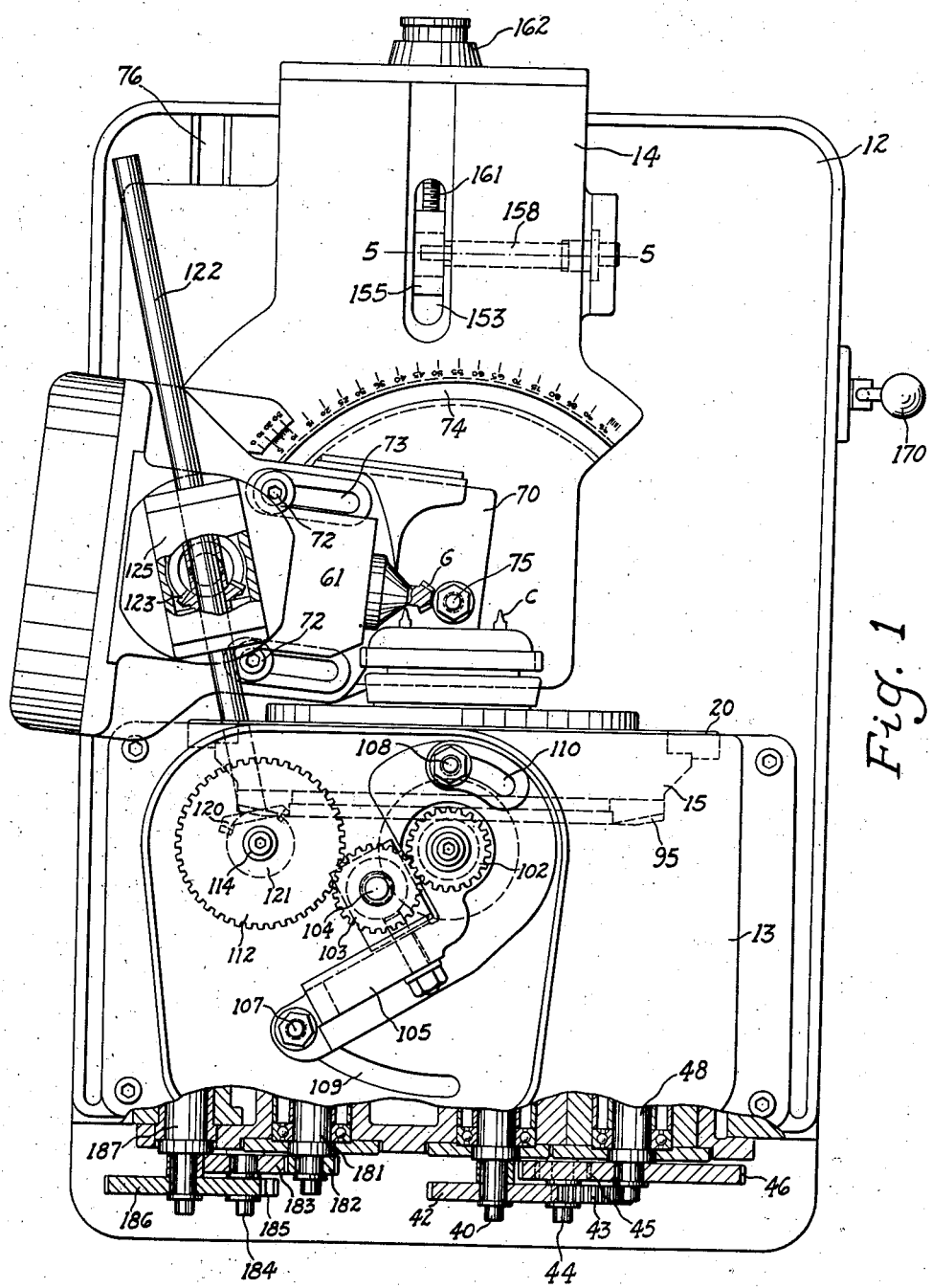
Fig. 1 is a plan view, with parts broken away, of a gear cutting machine constructed according to one embodiment of the present invention.
Figure 4:
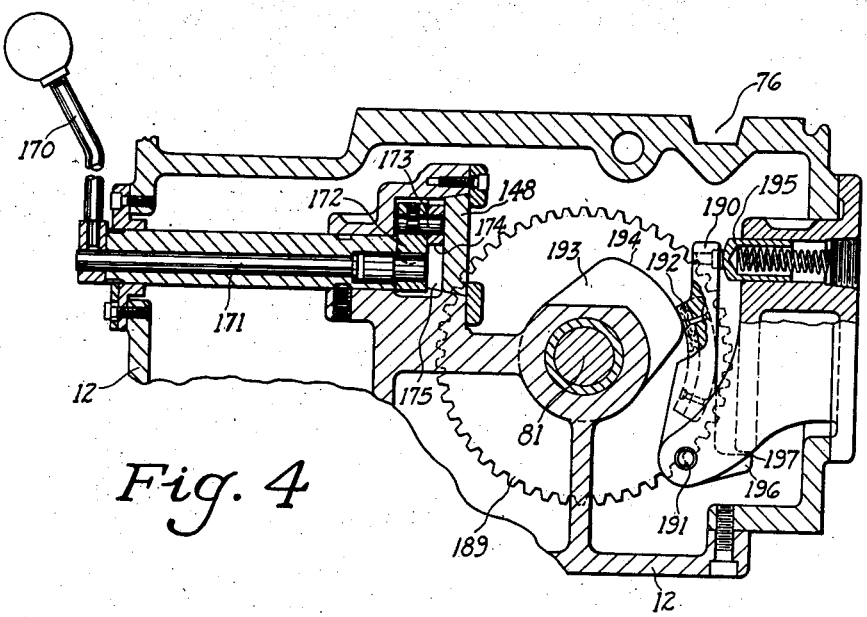
Figure 5:
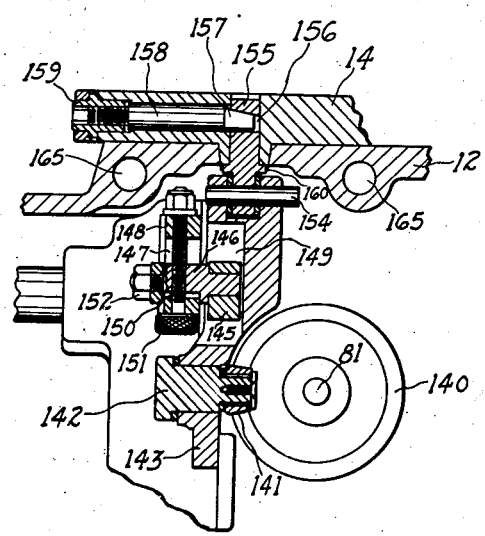

Fig. 4 is a fragmentary transverse sectional view through the base of the machine showing particularly the quick throw-out mechanism and the brake for preventing the weight of the cradle from driving the cradle actuating means on the rapid return roll; and Fig. 5 is a fragmentary sectional view on the line 5—5 of Fig. 1, showing further details of the quick throw-out mechanism and of the means for connecting the feed-cam lever to the sliding base.

The machine illustrated in the drawings is a spiral bevel gear generator of the intermittent indexing type and employs a face-mill type of gear cutter. The cutter is journaled eccentrically in a rotatable carrier which is, in turn, eccentrically journaled in the cradle.

The cutter is driven from the drive motor of the machine through a gear train that includes speed change gears, a telescoping shaft and a final set of bevel gears, one of which is secured to the cutter spindle.

The work spindle is journaled in a head that is mounted on a sliding base for axial and angular adjustment to accommodate gears of different cone distances and cone angles. The sliding base is mounted to reciprocate in the direction of the cradle axis. The reciprocating movement of the sliding base is controlled by a feed cam driven from the drive motor through suitable change gears. The feed cam is formed to move the work alternately to and from operative relation with the cutter. A tooth space is cut in the gear blank when the cutter and work are in operative relation and the blank is indexed when the work has been withdrawn from operative relation with the cutter.

The generating roll is controlled by a second cam which is mounted on the same shaft as the feed cam. This second cam actuates a lever which is connected by a link with the cradle. The work spindle is driven in time with the cradle rotation to effect the generating roll through a pair of bevel gears, one of which is secured to the cradle, change gears that govern the ratio of roll, an overhead telescoping shaft, and a final pair of bevel gears that are connected to the work spindle through the index mechanism.

The index mechanism may be of any suitable type and is operated by the generating roll.

In the preferred embodiment of the invention, the cam that controls the oscillation of the cradle is constructed to produce uniform roll of the cradle during generation of the tooth profiles. For transmission of the uniform motion to the cradle, the center of the cradle, the center of the actuating lever, and the pivot points of the link that connects the actuating lever with the cradle form a parallelogram. The feed cam which controls the movement of the sliding base may be made so that it merely moves the work to and from operative position with a dwell during cutting or may be made to produce a uniform motion of the work axially of the cradle during cutting. This uniform movement may be such either as to cause a continuous advance of the work into the cutter during the generating roll or a continuous withdrawal of the work relative to the cutter during generation. By employing uniform roll of cradle and uniform motion of the work axially of the cradle, a pair of tooth surfaces may be cut simultaneously on a spiral bevel gear blank without "bias bearing" according to the method disclosed in the Wildhaber Patent No. 1,980,365 of November 13, 1934.

The roll cam, as already described, is constructed to produce rapid return movement of the cradle after a generating roll has been completed. The weight of the cradle tends to drive this cam and the train of gearing for actuating the same ahead during the return roll. To overcome this, a brake mechanism is provided. This consists of a spring-pressed brake and of an arm which is secured to the shaft that carries the feed and roll cams. The arm has a peripheral surface of limited angular extent and is so positioned that the brake engages this peripheral surface during the return roll, thereby applying a braking effect on the driving cam shaft and preventing the cradle itself from driving this shaft.

Reference will now be had to the drawings for a more detailed description of the invention.

Figure 2:
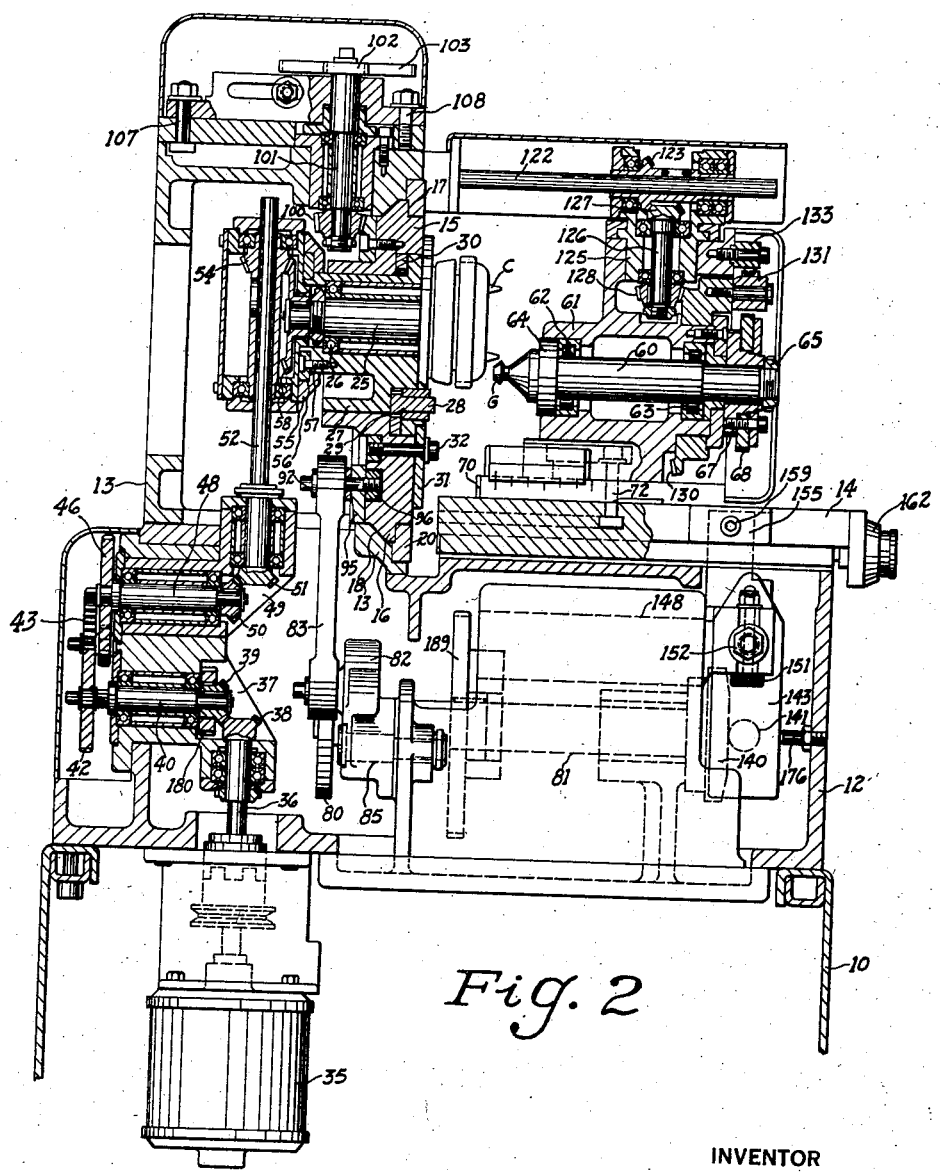
Fig. 2 is a fragmentary vertical sectional view through this machine, showing the work spindle swung out of operating position.

The machine shown in the drawings is of quite small size. It is mounted upon a stand or pedestal which may be of any suitable construction and which is here denoted as 10 (Fig. 2). The machine proper has a base 12 on which there is mounted an upright or housing 13 and a sliding-base 14.

The cradle 15 is oscillatably mounted in the upright 13. The cradle is formed with a single guide 16, as clearly shown in Fig. 2. This guide has a plane front face 17 and a conical rear surface 18. It is held in a conical way or seat formed on the upright 13 by a gib 20 which has a plane inside face to engage the plane front face of the way 16. Gib 20 may be secured by screws or other suitable means to the upright 13.

The use of a single guide for the cradle constitutes one of the structural improvements of the machine since by the use of such a single guide, greater accuracy in mounting the cradle is attainable.

The cutter denoted as C, is secured in any usual or suitable manner to the cutter spindle 25. This spindle is mounted on suitable bearings 26 in an eccentric carrier 27 and is so mounted in the carrier that the axis of the spindle is eccentric of the axis of the carrier. The carrier in turn is eccentrically journaled in the cradle 15. The carrier may be adjusted rotatably in the cradle to permit of adjustment of the cutter for cutting gears of different spiral angles, by rotating the stub-shaft 28. This shaft is journaled in the carrier 27 and integral with it is spur pinion 29 that engages an internal gear 30 which is secured to the cradle. This eccentric mounting and adjustment of the cutter has been used previously in spiral bevel gear generating machines and forms no part of the present invention. A plate or gib 31 and bolt 32 are provided to secure the eccentric carrier to the cradle after adjustment.

During operation of the machine, the face-mill cutter C, which may be of any standard or suitable construction, is rotated continuously, being driven from the motor 35. This motor is secured to the under side of the base of the machine and is housed in the pedestal 10.

The armature shaft of the motor is connected by a suitable coupling to a vertical shaft 36 which is suitably journaled in a bracket 37 that is mounted in the base of the machine. Integral with the shaft 36 is a bevel pinion 38. This pinion meshes with a bevel gear 39 that is keyed to a shaft 40 which is also journaled in the bracket 37.

Keyed to the shaft 40 at its outer end is a spur pinion 42 which meshes with a spur gear 43 that is mounted on stub-shaft 44 (Figs. 1 and 2). The stub-shaft 44 carries a spur pinion 45 which meshes with a spur gear 46 that is keyed to a shaft 48. The shaft 48 is suitably journaled in a swivel bracket 49 that is journaled in the bracket 37. A bevel pinion 50 is keyed to the shaft 48 at its inner end and meshes with a bevel gear 51 that is integral with an elongated shaft 52 that is journaled at its lower end in the swivel bracket 49.

At its upper end, the shaft 52 has telescopic driving engagement with a bevel pinion 54. This pinion 54 is suitably journaled in a swivel-bracket 55 that is rotatably mounted on the carrier 27 and that is held thereon by a gib 56 and screws 57. The bevel pinion 54 meshes with a bevel gear 58 that is keyed to the cutter spindle 25.

The described swivel telescoping drive to the cutter keeps the size of the cradle down and correspondingly keeps the size of the machine at a minimum.

The gear or pinion G to be cut is secured in any suitable manner to the work spindle 60 of the machine. The work spindle is journaled in the work head 61 on spaced straight roller bearings 62 and 63. The work spindle is provided with a collar or shoulder 64 which seats against the front bearing to take axial thrusts and is drawn up against this bearing by the nut 65 which threads on to the rear end of the spindle.

This nut 65 also serves to hold in place the ratchet wheel 67 and index plate 68 of the index mechanism of the machine. This index mechanism may be of any suitable construction, such as, for instance, that of the United States Patent to Hill et al. No. 1,816,376 of July 28, 1931. It is intended to be tripped from the roll of the machine. It forms no part of the present invention.

The work head 61 is slidably mounted on a plate 70 for adjustment in a direction axial of the work spindle. This adjustment is for the purpose of positioning the gear blank in accordance with the cone distance of the gear to be cut. The plate 70 is adjustable angularly on the sliding base 14 about the axis of the stud 75 to enable the gear blank to be correctly positioned angularly in accordance with the pitch cone angle of the gear to be cut.

After adjustment of the work head on the plate 70 and of the plate 70 on the sliding base 14, the parts are secured in adjusted positions by T-bolts 72 which pass through elongated slots 73 in the plate 70 and have their heads engaging in an arcuate T-slot 74 formed in the upper face of the sliding base 14. Suitable graduations are provided to enable the linear and angular adjustments of the work to be made accurately.

The sliding base 14 is mounted to slide on the base 12 of the machine in a direction axial of the cradle 15. It is guided in this movement by a V-shaped guide (not shown) which engages in the V-shaped way 76 formed on the upper face of the base 12 (Figs. 1 and 4).

Figure 3:
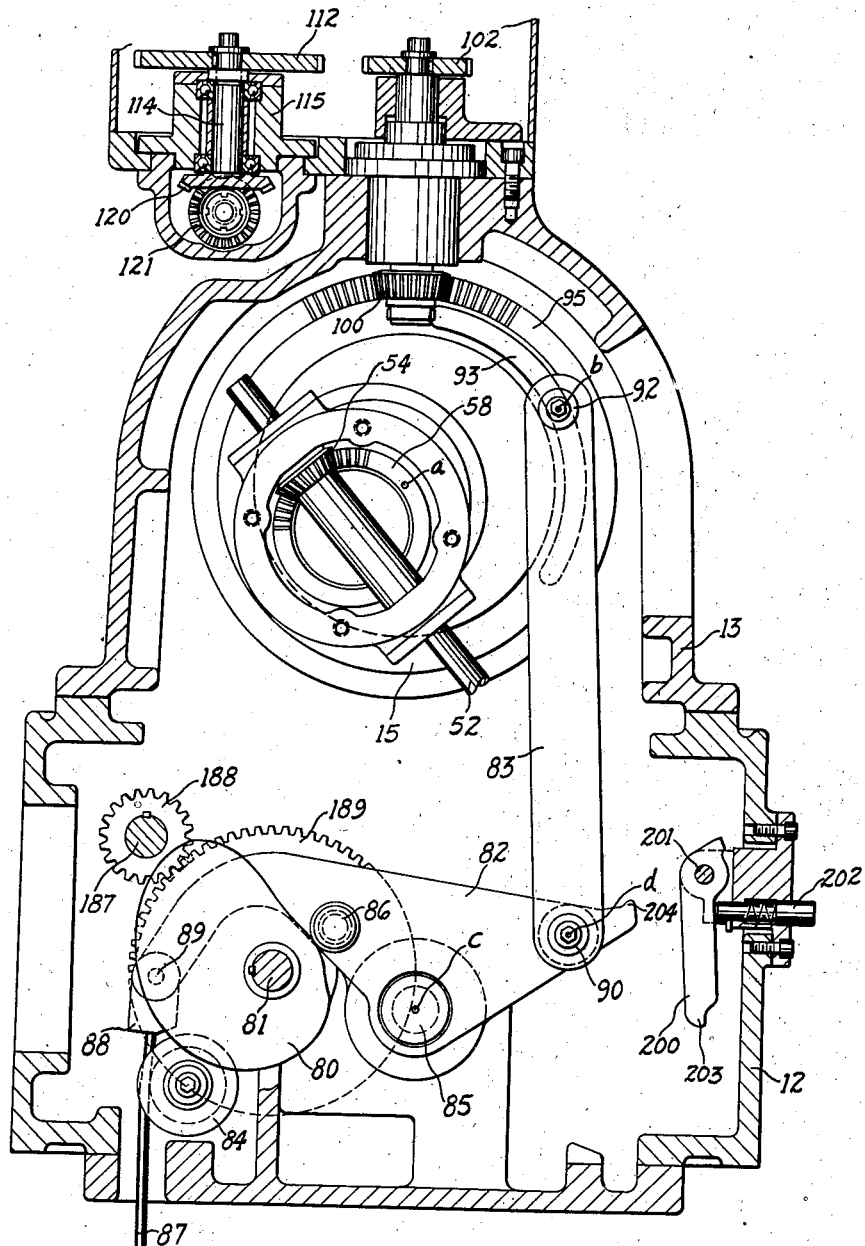
Fig. 3 is a fragmentary vertical sectional view on a somewhat enlarged scale, showing particularly the mechanism for oscillating the cradle.

The oscillating movement for alternate generating and return roll is imparted to the cradle 15 by a cam 80 (Figs. 2 and 3). This cam is keyed to a shaft 81 that is suitably journaled in the base 12 of the machine. The motion of the cam 80 is transmitted to the cradle through a lever 82 and a link 83.

The lever is fulcrumed at 85 in the base of the machine. It carries a roller 86 which engages the periphery of the cam 80. The roller is held in contact with the cam by a counterweight (not shown) which is housed in the pedestal of the machine and which is connected by a belt or cable 87 and button 88 with the lever 82. The button 88 is pivotally connected to the lever at 89. An idler roller 84 is mounted in the base of the machine as a guide for the cable or belt 87.

The link 83 is pivotally connected at its lower end to the lever 82 by a pin 90. At its upper end, this link is adjustably connected to the cradle by a stud 92. This stud passes through an elongated arcuate slot 93, that is formed in a bevel gear 95, and threads into a nut 96 (Fig. 2) which is mounted in a registering slot formed in the cradle. The bevel gear 95 is secured to the rear face of the cradle by screws or other suitable means. The elongated slot 93 permits of adjustment of the cradle with reference to the link 83 to permit of adjustment of the position of swing of the cradle.

The cam 80 has a uniform rise for the greater part of its periphery followed by a quick return portion.

The length of the link 83 and the points of its connection with the lever 82 and the cradle 15, moreover, are preferably so chosen that the center $a$ of the cradle, the point $b$ of connection of the link with the cradle, the center $c$ of the fulcrum of the lever 82, and the point $d$ of connection of the link with the lever form a parallelogram. Hence, as the cam 80 is rotated continuously in one direction, an oscillating motion is imparted to the cradle which is at a uniform rate during the uproll, when the teeth of the gear are being cut by the cutter C, and which is at an accelerated rate on the return roll when the work is out of operative relation with the cutter and is being indexed.

The work spindle is driven from the cradle in time with the cradle motion during the uproll in order to produce the proper generating movement. The bevel gear 95, which is secured to the cradle, meshes with a bevel pinion 100 (Figs. 2 and 3) which is keyed to a vertical shaft 101. This shaft is suitably journaled in the upright or housing 13 and carries at its upper end a spur pinion 102. The spur pinion 102 meshes with a spur gear 103 which is mounted on a stud 104 that is carried by a quadrant 105 (Fig. 1). The quadrant 105 may be of any usual or suitable construction and is adjustably secured to the upright or housing 13 by bolts 107 and 108 that pass through arcuate slots 109 and 110, respectively formed in the upright and quadrant, respectively.

The gear 103 meshes with a gear 112 (Figs. 1 and 3) that is keyed to a vertical shaft 114 that is suitably journaled in a bracket 115. This bracket is suitably secured to the housing 13. The shaft 114 carries at its lower end a bevel gear 120 which meshes with the bevel gear 121 which is integral with an elongated shaft 122. The elongated shaft 122 has telescopic driving engagement with a bevel pinion 123 (Figs. 1 and 2). This pinion is suitably journaled in a swivel-bracket 125 that is rotatably mounted on the work head 61 for angular movement about the axis of a shaft 126 which carries a bevel gear 127 at its upper end. This bevel gear 127 meshes with the bevel pinion 123.

The shaft 126 is suitably journaled in the swivel bracket 125 and keyed to its lower end is a bevel pinion 128 that meshes with a bevel gear 130. The bevel gear 130 is journaled on the work head 61 and carries the locking lever 131 of the index mechanism of the machine. During the generating uproll, the locking lever 131 is in engagement with the index plate 68 so that the motion of the gear 130 is transmitted through the index plate to the work spindle 60 and thence to the work piece which is mounted thereon.

133 denotes the trip-dog of the indexing mechanism which, as already described, may be of any suitable construction and such as, for instance, described in the Hill patent above mentioned.

At the completion of the uproll, after a tooth surface or a pair of tooth surfaces of the gear have been generated, the work is withdrawn from operative relation with the cutter to permit of its being indexed. The indexing operation takes place during the return roll of the cradle. The trip-dog 133 trips the locking lever 131 out of engagement with the index plate 68 at a predetermined point in the return roll according to known practice. Then the blank is indexed. When the indexing has been completed, the locking lever is returned to operative position, connecting the bevel gear 130 again to the work spindle. At the end of the return roll, the work is returned into operative relation with the cutter again so that on the ensuing uproll, another tooth surface or pair of tooth surfaces of the gear may be cut.

The withdrawal and feed movements of the work are produced by movement of the sliding base 14 and are controlled by a cam 140 (Figs. 2 and 5) which is fastened to the shaft 81. The cam 140 is a face cam and engages a roller 141 that is carried by a stud 142 which is secured in a lever 143. This lever is normally fulcrumed on a block 145 that is carried by a stud 146. The stud 146 is adjustable in the vertical slot 147 formed in a slide 148. The block 145 itself is adjustable in an elongated slot 149 formed in the lever 143. The adjustment of the stud 146 is effected by rotation of the screw 150 through rotation of the knurled nut 151. The stud is clamped in any adjusted position by the nut 152.

The lever 143 is bifurcated at its upper end and is pivotally connected by means of a pin 154 with a headed connecting member 155. This member engages in a slot 153 (Figs. 1 and 5) in the sliding base 14. The connecting member 155 is formed with a wedge-shaped opening or slot 156 to receive the wedge-shaped head 157 of a clamping bolt 158.

This clamping bolt 158 is mounted in an opening in the sliding base 14 for axial movement therein and is adjusted by means of a nut 159 that threads on the outer end of the bolt. The connecting member 155 is provided with a shoulder at 160. By adjusting the wedge-bolt 158 inwardly, then, the connecting member 155 can be securely engaged with the sliding base 14 to hold the connecting member securely to the sliding base and thereby connect the lever 143 with the sliding base.

A screw 161, which is journaled in the sliding base 14 and which threads into the connecting member 155, serves to adjust the sliding base 14 on the base 12 to compensate for wear of the cutter, tooth-depth of the gear to be cut, etc. A graduated dial 162 is provided to permit this adjustment to be made precisely.

Coil-springs (not shown), that are mounted in the holes 165 (Fig. 5) drilled in the base 12 and that bear against lugs (not shown) formed on the sliding base 14, serve to hold the roller 141 against the cam 140.

The cam 140 may be formed so that after the work is moved into operative relation with the cutter, it will dwell in operative position during cutting. The cam 140 may also be formed, however, so that it will impart a continuous feed or withdrawal movement to the work during cutting. When this continuous feed or withdrawal motion is at a uniform rate, it will serve in combination with the uniform cradle rotation under actuation of the cam 80 to provide a relative helical motion between the cutter and the work about the axis of the cradle during generation and this helical motion may be employed as described in the Wildhaber patent already mentioned, to permit the cutting of two tooth surfaces of a gear simultaneously without "bias bearing."

When all of the tooth surfaces of a gear have been cut, the sliding base 14 may be moved to loading position, to permit of taking the completed gear blank off of the work spindle and chucking a new gear blank, by moving the lever 170 (Fig. 4). This lever is secured to a shaft 171 that is journaled in the base 12 of the machine and that has keyed to its inner end a crank-member 172. The crank-member 172 is connected by means of a pin 173 with a block 174 that engages in a slot 175 formed in the slide 148. A stud 176 that threads into the base 12 (Fig. 2) bears against one side of the lever 143. When the lever 170 is actuated, then, the stud 176 forms a fulcrum for the lever 143, and the sliding base 14 accordingly is moved an extended distance to or from loading position. This quick withdrawal mechanism is similar to that described in the Hill et al. patent above mentioned and forms no part of the present invention.

The roll control cam 80 and the feed control cam 140 are mounted on the same shaft 81. This shaft is driven from the motor 35 through a spur pinion 180 (Fig. 2) which is keyed to the bevel gear 39. This pinion 180 meshes with the spur gear (not shown) that is secured to the shaft 181 (Fig. 1). Keyed to the shaft 181 at its outer end is a spur pinion 182. This pinion meshes with a spur gear 183 on a stub-shaft 184. The stub-shaft 184 carries a second spur pinion 185. This pinion 185 meshes with a spur gear 186 that is keyed to a shaft 187 (Figs. 1 and 3). Keyed to the shaft 187 at its inner end is a spur pinion 188 (Fig. 3) that meshes with a spur gear 189 which is secured to the shaft 81.

During the return roll of the cradle, the weight of the cradle would ordinarily tend to drive the gear 189 and the train which normally actuates the same. To avoid this, the brake mechanism, which will now be described, is provided. This brake mechanism includes an arm 190 which is pivotally mounted at 191 (Fig. 4) in the base of the machine. This arm is formed with an arcuate surface to which is secured a brake lining 192. Keyed to the shaft 81 is an arm 193 that has an arcuate peripheral surface 194. The arm 190 is moved into operative position by a spring pressed plunger 195 which is housed in the base of the machine. The arm 194 is so positioned angularly on the shaft 81 that it is in engagement with the brake 192 only during the return roll of the cradle. During the uproll of the cradle, it is out of engagement with the brake. A tail piece 196, that is formed integral with the arm 190 and that is adapted to abut against a lug 197 formed on the base of the machine serves to prevent the brake arm 190 from moving inwardly too far when the arm 193 is out of registry with the brake.

The operation of the machine will be understood from the preceding description but may be briefly summed up here. First of all, of course, the work piece is chucked on the gear spindle and a suitable cutter is placed on the cutter spindle and the various necessary adjustments of the machine are made. Then the sliding base 14 is moved into working position by operating the handle 170. Then the machine may be started by starting the drive motor 35. This causes the cutter C to be rotated through the gearing 38, 39, 42, 43, 45, 46, 50, 51, 54, and 58. As the motor rotates, also, the cam shaft 81 is rotated through the gear 180, shaft 181, and the gearing 182, 183, 185, 186, 188, and 189. Thus the two cams 80 and 140 are rotated. As the cam 140 rotates, it first causes the sliding base 14 to move inwardly, to move the work from withdrawn position into operative relation with the cutter. When the work reaches operative position, the cam 80 starts the uproll of the cradle 15 and as the cradle rolls upwardly, the work piece is rotated in time with it through the gearing 95, 100, 102, 103, 112, 120, 121, 123, 127, 128, and 130 and the indexing mechanism of the machine which at this time is in locked position. If the helical motion is being employed to eliminate "bias bearing," the movement of the sliding base relative to the cradle continues during the whole of the generating uproll.

During the uproll, the cutter cuts a tooth surface or a tooth space of the gear blank. When the roller 86 of the lever 82 rolls off of the high point of the cam 80, the return roll of the cradle begins. Either at this point or just before the end of the uproll, the feed cam 140 will start to withdraw the sliding base 14 to withdraw the work from operative relation with the cutter. Just before the return roll begins or at the moment that it begins, the arm 193 comes into engagement with the brake mechanism 190 so that on the return roll, the weight of the cradle will not drive the parts of the machine.

When the work has been withdrawn sufficiently from the cutter by the feed cam 140, the index mechanism of the machine is tripped and the work is indexed. At the end of the return roll, or just before the end of the roll and after indexing has been completed, the feed cam 140 acts to return the work again into operative relation with the cutter, so that when the uproll begins again, the cutter operates on a new tooth surface or tooth space of the blank.

So the operation of the machine proceeds, the work is fed into the cutter, a tooth surface or pair of tooth surfaces are cut on the uproll, then the work is withdrawn from the cutter, the roll is reversed and the blank is indexed. When all of the tooth surfaces of the blank have been cut, the motor 35 is stopped. This may be done manually or a standard automatic stop may be provided for the purpose. Then, the sliding base 14 may be moved to loading position by swinging the handle 170 over to cause the lever 143 to pivot about the stud 176 instead of about its normal operating fulcrum, the block 145. When the completed gear has been taken off the machine and a new work piece chucked, the handle 170 may be thrown back to return the sliding base 14 to the normal outside limit of its working cycle. Then the motor 35 may be restarted to start the operating cycle of the machine again.

To prevent movement of the cradle during adjustment of the cutter or while changing the roll change gears, a locking-dog 200 (Fig. 3) is provided. This dog is pivoted at 201 in the base of the machine and normally hangs idle.

The dog is moved to operative position by pressing in the plunger 202, which is housed in the base of the machine. If the parts are in the position shown in Fig. 3, the lever 82 must move clockwise far enough for the lug 204 formed on the lever to pass under the nose 203 of the dog before the nose can engage the lug and lock the lever. To release the dog, the movement of the lever may be continued further clockwise until the dog drops again into idle position.

The provision of a cam 80 for controlling the generating roll very considerably simplifies the machine. It makes it possible to eliminate entirely the expensive reversing mechanism and differential heretofore required in "geared-roll" types of bevel gear generators. The drive of the work spindle from the cradle enables a further simplification since it reduces very materially the number of gears required in the generating train connecting the cradle and work spindle. The overhead drive from cradle to work spindle permits of still further simplification since it makes possible a still further reduction in the gears required in the generating train. Heretofore, in "geared-roll" machines, the drive to the work spindle has gone normally through the center of swing of the work-head by means of a vertical shaft and the necessary connecting gearing. The overhead, telescoping drive of the present machine permits of eliminating several gears and shafts from the generating train. By driving the cam shaft 81 through cylindrical gears 188 and 189, excessive gearing up through change gears is avoided. Thus the necessity for large-size change gears is avoided, and the machine can be made more compact than would be the case if a worm and wormwheel drive to the cam shaft were employed. The machine of the present invention, then, is quite simple and compact.

While the invention has been illustrated in connection with a machine for cutting spiral bevel gears, it will be obvious that various features of the invention may be employed on machines for generating other types of gears also. It is to be understood that this application is intended to cover any adaptation or embodiment to the invention, following in general, the principles of the invention, and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine for generating tapered gears, a work support, a tool support, an oscillatory cradle on which one of said supports is mounted, a rotatable work spindle journaled in the work support, a tool mounted on the tool support, means for actuating the tool, means including a rotatable cam for oscillating the cradle, a train of gearing including a set of rotary change gears connecting the cradle with the work spindle to rotate the work spindle in time with the cradle movement to generate the tooth profiles, and means for periodically indexing the work spindle.

2. In a machine for generating tapered gears, a work support, a tool support, an oscillatory cradle on which one of said supports is mounted, a rotatable work spindle journaled in the work support, a tool mounted on the tool support, means for actuating the tool, means including a rotatable cam for oscillating the cradle, a train of gearing driven by the cradle in its movement and including a set of rotary change gears connecting the cradle with the work spindle to rotate the work spindle in time with the cradle to generate the tooth profiles, and means for periodically indexing the work spindle.

3. In a machine for generating tapered gears, a work support, a tool support, an oscillatory cradle on which one of said supports is mounted, a sliding base on which the other support is mounted, said base being reciprocable in the direction of the cradle axis, a work spindle journaled in the work support, a tool mounted on the tool support, means for actuating the tool, means including a rotatable cam for oscillating the cradle, said cam being constructed to produce a movement of the cradle at a uniform rate when the cradle is moved in one direction, means including a cam for reciprocating the sliding base, said cam being adapted to impart a movement at a uniform rate to the sliding base during movement of the cradle in the described direction, and a train of gearing connecting the work spindle with the cradle for rotating the work spindle in time with the cradle movement during movement of the cradle in the described direction.

4. In a machine for generating tapered gears, a work support, a tool support, a cradle on which one of said supports is mounted, a rotatable work spindle journaled in the work support, a tool mounted on the tool support, means for actuating the tool, means for oscillating the cradle comprising a rotatable cam, a pivoted lever, a follower carried by said lever and engaging said cam, and a link pivotally connected at one end to the lever and at its opposite end to the cradle, the pivot point of the lever, the points of pivotal connection of the link with the lever and with the cradle, and the center of the cradle forming a parallelogram, and said cam being provided with a uniform rise portion to control the movement of the cradle in one direction, and means for rotating the work spindle in time with the cradle movement when the cradle is moving in the described direction.

5. In a machine for generating tapered gears, a work support, a tool support, a cradle on which one of said supports is mounted, a rotatable work spindle journaled in the work support, a tool mounted on the tool support, means for actuating the tool, means for oscillating the cradle, means for rotating the work spindle in time with the cradle movement during movement of the cradle in one direction, and means for preventing the weight of the cradle from driving the cradle actuating means during movement of the cradle in the opposite direction.

6. In a machine for generating tapered gears, a work support, a tool support, a cradle on which one of said supports is mounted, a rotatable work spindle journaled in the work support, a tool mounted on the tool support, means for actuating the tool, means for oscillating the cradle comprising a rotary cam and means operatively connecting the cam to the cradle, a brake mechanism, and means for applying the brake mechanism during movement of the cradle in one direction, to prevent weight of the cradle from driving the cam.

7. In a machine for generating tapered gears, a work support, a tool support, a cradle on which one of said supports is mounted, a rotatable work spindle journaled in the work support, a tool mounted on the tool support, means for actuating the tool, means for oscillating the cradle comprising a cam, a rotary shaft on which the cam is mounted, and means for driving the shaft, a brake member, and an arm secured to the shaft in predetermined angular relation to the cam and adapted to be engaged by the brake member during part of the revolution of the shaft to prevent the weight of the cradle from driving the shaft on the return roll of the cradle.

8. In a machine for generating tapered gears, a work support, a tool support, an oscillatory cradle on which the tool support is mounted, a work spindle journaled in the work support, means for oscillating the cradle and means for driving the work spindle from the cradle in time with the cradle comprising a gear secured to the cradle, indexing mechanism for the work spindle, and a train of gearing connecting the indexing mechanism with said gear to be driven by said gear on movement of the cradle.

9. In a machine for generating tapered gears, a work support, a tool support, an oscillatory cradle on which the tool support is mounted, a work spindle journaled in the work support, means for oscillating the cradle, and means for driving the work spindle in time with the cradle comprising a gear secured to the cradle, and a train of gearing including a set of change gears for connecting the cradle to the work spindle and adapted to be driven on movement of the cradle.

10. In a machine for generating tapered gears, a work support, a tool support, an oscillatory cradle on which the tool support is mounted, a work spindle journaled in the work support, means for oscillating the cradle, and means for driving the work spindle in time with the cradle comprising a tapered gear secured to the cradle, a tapered gear meshing therewith, index mechanism for the work spindle, and a train of gearing connecting the second tapered gear with the index mechanism and comprising a set of change gears and a final pair of tapered gears, one of which is connected to the index mechanism.

11. In a machine for generating tapered gears, an oscillatory cradle, a tool support mounted on the cradle, a work support adjustable angularly about an axis inclined to the axis of the cradle, a work spindle journaled in the work support, means for oscillating the cradle, and means for driving the work spindle from the cradle in time with the cradle motion comprising a telescoping shaft, gearing mounted in offset relation to the axis of adjustment of the work support and connecting the telescoping shaft at one end to the cradle, and gearing mounted in offset relation to the axis of adjustment of the work support and connecting the telescoping shaft at its opposite end to the work spindle.

12. In a machine for generating tapered gears, an angularly adjustable work support, a tool support, a cradle on which one of said parts is mounted and which is oscillatable about an axis extending at right angles to the axis of adjustment of the work support, a sliding base on which the other part is mounted and which is reciprocable in the direction of the axis of the cradle, a shaft extending in the direction of the axis of the cradle, a pair of cams secured thereto, one of which controls the oscillation of the cradle and the other of which controls the reciprocation of the sliding base, a tool mounted on the tool support, means for actuating the tool, means for rotating the shaft, and means for rotating the work support in time with the cradle rotation during movement of the cradle in one direction comprising a pair of tapered gears, one of which is secured to the cradle, a set of change gears driven by said pair of tapered gears, a second pair of tapered gears operatively connected to the work spindle, and a pivotally mounted telescoping shaft which has an operative swivelling connection at one end with the change gears and at its opposite end with the second pair of tapered gears and which is mounted at one side of the cradle axis.

G. H. BRYAN.